United States Patent
Luh

(10) Patent No.: US 6,840,875 B2
(45) Date of Patent: Jan. 11, 2005

(54) SYSTEM FOR ADJUSTING THE CONTACT PRESSURE OF A CONTINUOUSLY VARIABLE GEAR

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 10/204,956

(22) PCT Filed: Dec. 19, 2001

(86) PCT No.: PCT/DE01/04802

§ 371 (c)(1),
(2), (4) Date: Aug. 27, 2002

(87) PCT Pub. No.: WO02/055906

PCT Pub. Date: Jul. 18, 2002

(65) Prior Publication Data

US 2003/0114259 A1 Jun. 19, 2003

(30) Foreign Application Priority Data

Jan. 13, 2001 (DE) .......................... 100 01 356

(51) Int. Cl.[7] .......................... F16H 59/00; F16H 63/00
(52) U.S. Cl. .......................................... 474/18; 474/28
(58) Field of Search .................... 474/18, 28, 12, 474/70; 477/44–46, 48, 50

(56) References Cited

U.S. PATENT DOCUMENTS

| | | | | |
|---|---|---|---|---|
| 5,334,102 A | * | 8/1994 | Sato ............................. | 474/18 |
| 5,431,602 A | * | 7/1995 | Hendriks et al. ............. | 474/28 |
| 5,885,178 A | * | 3/1999 | Luh .............................. | 474/28 |
| 5,944,626 A | * | 8/1999 | Spiess et al. ................. | 474/28 |
| 5,971,876 A | | 10/1999 | Spiess et al. | |
| 6,179,739 B1 | * | 1/2001 | Tsai et al. ..................... | 474/18 |
| 6,290,620 B1 | * | 9/2001 | Tsai et al. ..................... | 474/18 |
| 6,299,564 B1 | * | 10/2001 | Gessler et al. ................ | 477/45 |
| 6,682,451 B1 | * | 1/2004 | Luh et al. ..................... | 474/28 |

FOREIGN PATENT DOCUMENTS

| | | | | |
|---|---|---|---|---|
| DE | 4436506 A1 | * | 10/1994 | .......... F16H/59/06 |
| DE | 19533976 A1 | * | 9/1995 | .......... F16H/61/00 |
| DE | 195 19 162 A | | 11/1996 | |
| DE | 197 02 549 A | | 8/1997 | |
| DE | 100 17 402 1 | | 10/2001 | |
| EP | (0634590) A1 | * | 1/1995 | .......... F16H/61/00 |

* cited by examiner

*Primary Examiner*—Marcus Charles
(74) *Attorney, Agent, or Firm*—Michael J. Striker

(57) ABSTRACT

A system (10), in particular an electrohydraulic system (10), for adjusting the contract pressures of a continuously variable gear, in particular a double-cone pulley belt-contact gear, which has a device for changing the gear ratio of the gear having at least one primary pressure chamber and one secondary pressure chamber is proposed. An electrically triggerable primary pressure valve ($V_{prim}$) for adjusting the pressure in the primary pressure chamber and an electrically triggerable secondary pressure valve ($V_{sec}$) for adjusting the pressure in the secondary pressure chamber are provided. The pressure ($p_{prim}$) of the primary pressure chamber and the pressure ($p_{sec}$) of the secondary pressure chamber can be carried to the secondary pressure valve ($V_{sec}$). The object is to enable a more-accurate adjustment of the pressure ($p_{prim}$) in the primary pressure chamber. To that end, the trigger current ($I_{sec}$) of the secondary valve ($V_{sec}$) is set to a value which corresponds to a predetermined pressure ($p_{sec,soll}$) in the primary and the secondary pressure chamber. Moreover, the pressure ($p_{sec,soll}$) in the secondary pressure chamber is regulated, via the trigger current ($I_{prim}$) of the primary valve ($V_{prim}$), so that the pressure ($p_{prim}$) in the primary pressure chamber is established indirectly.

12 Claims, 1 Drawing Sheet

SYSTEM FOR ADJUSTING THE CONTACT PRESSURE OF A CONTINUOUSLY VARIABLE GEAR

BACKGROUND OF THE INVENTION

The invention is based on a system, in particular an electrohydraulic system, for adjusting the contract pressures of a continuously variable gear.

One such system is known from German Patent Disclosure DE 195 19 162 A1, for example, or U.S. Pat. No. 5,971,876. A device for changing the ratio of the gear, having a primary pressure chamber and a secondary pressure chamber, is provided. Moreover, an electrically triggerable primary pressure valve for adjusting the pressure in the primary pressure chamber and an electrically triggerable secondary pressure valve for adjusting the pressure in the secondary pressure chamber are present. The pressure of the primary pressure chamber and the pressure of the secondary pressure chamber can be carried to the secondary pressure valve.

In such a gear, the contract pressures must be adjusted such that no slip of a belt contact means occurs. However, care also be taken to assure that the contract pressures and hence wear not become unnecessarily great. Particularly when the gear is at a standstill, the possibility exists that the contract pressure, generated in the secondary pressure chamber, of the secondary pulley will not be transmitted fully to the primary pulley. An accurate adjustment of the pressure in the primary pressure chamber and of the contract pressure thus generated of the primary pulley is therefore necessary. An accurate adjustment of the pressure in the primary pressure chamber is possible only with difficulty.

SUMMARY OF THE INVENTION

The system according to the invention for adjusting the contract pressures of a continuously variable gear has the advantage over the prior art that a more-accurate adjustment of the pressure in the primary pressure chamber is possible. This is true particularly when the gear is at a standstill. It is also advantageous to do so when the gear is virtually at a standstill or is at the maximum gear ratio.

Further advantages and advantageous refinements of the system of the invention for adjusting the contract pressures of a continuously variable gear will become apparent from description.

BRIEF DESCRIPTION OF THE DRAWINGS

One exemplary embodiment of the invention is shown in the drawing and explained in further detail in the ensuing description.

In FIG. 1, a detail of a hydraulic circuit diagram is shown, and in

DESCRIPTION OF THE PREFERRED EMBODIMENT

Figure 1:
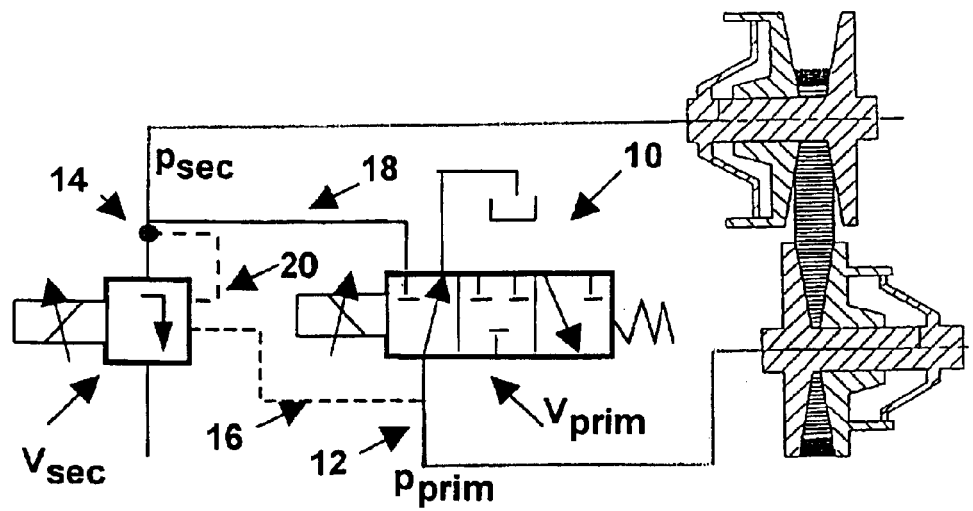

In FIG. 1, a system 10 for adjusting the contract pressures of a not shown continuously variable gear, in particular a double-cone pulley belt-contact gear, is shown. This system and its mode of operation are known for example from DE 195 19 162 A1 or U.S. Pat. No. 5,971,876.

A device, also not shown, for changing the ratio of the gear is also present and has at least one primary pressure chamber and one secondary pressure chamber. The system 10 communicates with the primary pressure chamber via a line 12 and with the secondary pressure chamber via a line 14. An electrically triggerable primary pressure valve $V_{prim}$ for adjusting the pressure $p_{prim}$ in the primary pressure chamber and an electrically triggerable secondary pressure valve $V_{sec}$ for adjusting the pressure $p_{sec}$ in the secondary pressure chamber are provided. From the line 14, a line 18 leads to the primary valve $V_{prim}$, from where the aforementioned line 14 leads to the primary pressure chamber. The pressure $p_{prim}$ is carried via a control line 16 to a pressure face of the secondary pressure valve $V_{sec}$, and as can be seen from FIG. 1, it acts counter to the force generated by the electrical triggering. The control line 16 can also be switchable via an additional valve—not shown. The pressure $p_{sec}$ is carried via a control line 20 to a different pressure face of the secondary pressure valve $V_{sec}$.

In operation of the gear, particularly when it is at a standstill, the requisite pressure $p_{pri,soll}$ in the primary pressure chamber and the requisite pressure $p_{sec,soll}$ in the secondary pressure chamber can be determined via a performance graph, as known for example from DE 195 19 162 A1 or U.S. Pat. No. 5,971,876.

Moreover, for more-accurate adjustment of the pressure $p_{prim}$ in the primary pressure chamber, the trigger current $I_{sec}$ of the secondary valve $V_{sec}$ is set to a required value $I_{sec,soll}$, which corresponds to a predetermined pressure $p_{pri,soll}$ in the primary pressure chamber and to a predetermined pressure $p_{sec,soll}$ in the secondary pressure chamber. The pressure $p_{sec}$ in the secondary pressure chamber is moreover regulated via the trigger current $I_{prim}$ of the primary valve $V_{prim}$, so that the pressure $p_{prim}$ in the primary pressure chamber is established indirectly. The trigger currents $I_{prim}$ and $I_{sec}$ correspond to control signals for the valves $V_{prim}$ and $V_{sec}$. If the valves $V_{prim}$ and $V_{sec}$ are not electrically triggered but are instead triggered hydraulically, then the control signals instead correspond to their pressures. However, regulation via electrical control signals in the form of trigger currents is more suitable.

For further improved control of the pressure $p_{prim}$ in the primary pressure chamber, the trigger current $I_{sec}$ of the secondary valve $V_{sec}$ is defined, in accordance with the formula $$f(I_{sec})=k_{prim}*p_{pri,soll}+k_{sec}*p_{sec,soll}$$

as a function of the sum of the product of a constant $k_{prim}$ of the primary pressure valve $V_{prim}$ and the pressure $p_{prim,soll}$ of the primary pressure chamber, and the product of a constant $k_{sec}$ of the secondary pressure valve $V_{sec}$ and the pressure $p_{sec,soll}$ of the secondary pressure chamber, which is done by regulating the pressure $p_{sec}$ in the secondary pressure chamber. The constant $k_{prim}$ and $k_{sec}$ depend on various factors, such as the effective surface areas of the valves $V_{prim}$, $V_{sec}$ to which the pressures $p_{prim}$, $p_{sec}$ are applied.

The regulation of the pressure $p_{prim}$ in the primary pressure chamber can also be improved further by providing that the pressure $p_{sec}$ in the secondary pressure chamber is regulated using the trigger current $I_{prim}$ of the primary pressure valve. This is a reversal of the triggering of pressure chambers compared to normal operation, and it is especially advantageous when the gear is at a standstill. It is also advantageous if the adjustment of the contract pressures is done when the gear is virtually at a standstill and/or is at the maximum gear ratio.

To that end, preferably the required and measured pressures $p_{sec,soll}$ and $p_{sec}$ in the secondary pressure chamber are delivered to a controller, such as a PID controller, whose outcome is used to determine the trigger current $I_{prim}$ of the primary pressure valve.

The regulating means, for example in the form of a controller with a suitable program, can contain an adaptation algorithm, with which the relationship between the predetermined pressure in the primary pressure chamber $p_{pri,soll}$ and the predetermined pressure in the secondary pressure chamber $p_{sec,soll}$ is learned in ongoing operation using the control signal, that is, the trigger current $I_{sec}$ of the secondary valve. This can preferably be done in a mode of operation in which the primary pressure $p_{prim}$ is nearly equal to the secondary pressure $p_{sec}$, or in which the primary pressure $p_{prim}$ is zero. For establishing the operating state in which the pressure ($p_{prim}$) in the primary pressure chamber is approximately equal to the pressure ($p_{sec}$) in the secondary pressure chamber, the primary pressure valve ($V_{sec}$) is opened in the direction of secondary pressure with the aid of the control signal ($I_{prim}$). For establishing the operating state in which the pressure ($p_{prim}$) in the primary pressure chamber is zero, the primary pressure valve ($V_{sec}$) is opened in the direction of low pressure with the aid of the control signal ($I_{prim}$).

In an advantageous feature, precisely one offset value or offset control signal $I_{sec,offset}$ of the control signal $I_{sec}$ is adapted, at which a predetermined pressure $p_{pri,soll}$ in the primary pressure chamber and a predetermined pressure $p_{sec,soll}$ in the secondary pressure chamber are established. The adaptation is effected by comparison of the predetermined pressure $p_{sec,soll}$ in the secondary pressure chamber with the measured pressure $p_{sec}$ in the secondary pressure chamber. That is, the ascertainment of the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber, the measured secondary pressure ($p_{sec}$) is compared with a predetermined pressure ($p_{sec,soll}$) of the secondary pressure chamber. As a function of the comparison, the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber is corrected. As a result, the requisite control signal $I_{sec}$ can be adapted constantly, or in other words can be adapted to the ideal value at a given time for establishing the pressure $p_{prim}$ in the primary pressure chamber. This is more flexible, compared to using a single fixed value, for instance from a defined performance graph. This makes the establishment of the pressure $p_{prim}$ more accurate.

Figure 2:
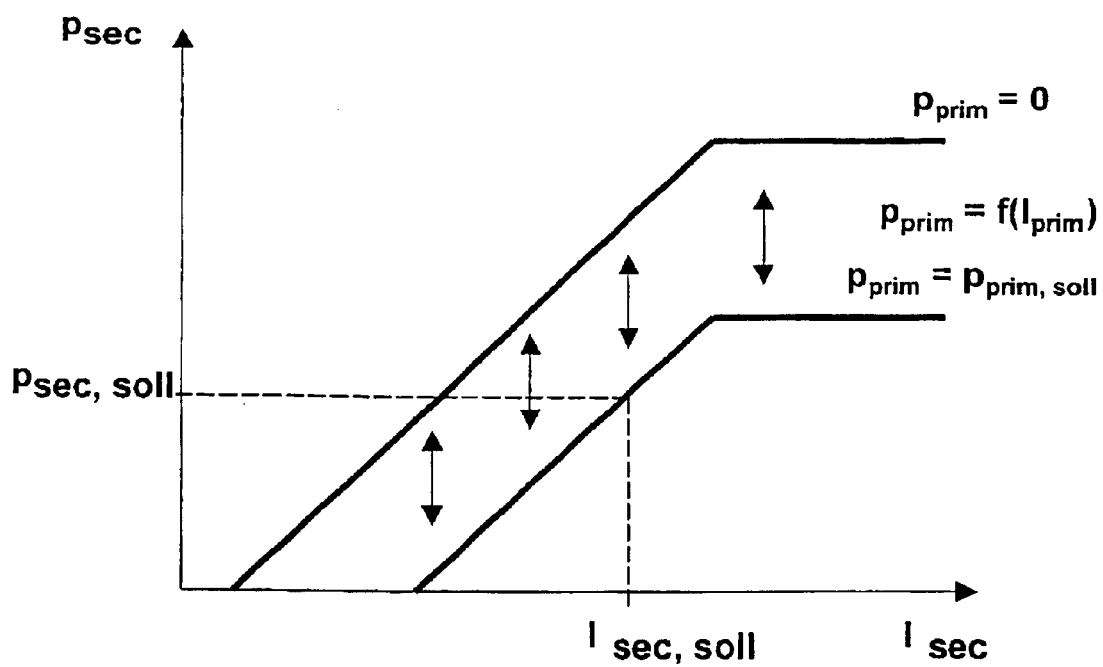
FIG. 2, there is a graph which illustrates the relationship between pressures and currents.

FIG. 2 shows a graph illustrating the relationship between the currents $I_{prim}$ and $I_{sec}$ and the pressures $p_{rim}$ and $p_{sec}$ more clearly; it is also more readily apparent from this how the pressure $p_{sec}$ in the secondary pressure chamber is regulated via the control signal $I_{prim}$ of the primary valve $V_{prim}$, and how the pressure $p_{prim}$ in the primary pressure chamber is established indirectly in the process. What is important here above all is the pressure ratio, generated by the control lines 16 and 20, at the secondary pressure valve $V_{sec}$.

Via the control line 20, which returns the pressure $p_{sec}$ to the secondary pressure valve $V_{sec}$, it is unambiguously defined what the pressure ratios are, since a force generated via the electrical triggering acts counter to the contrary force generated by the returned pressure. This is not true for the primary pressure valve $V_{prim}$, since the pressure $p_{prim}$ is not returned to the primary pressure valve $V_{prim}$.

From the graph, it can be seen that when the primary pressure valve $V_{prim}$ conducts the pressure out of the primary pressure chamber into the tank, the pressure $p_{sec}$ takes the course represented by the line $p_{prim}=0$, until the maximum generatable pressure for $p_{sec}$ is reached. Based on this, via the current $I_{prim}$, the pressure $p_{prim}$ can be adjusted to the value $p_{pri,soll}$. This is illustrated by the double arrows in FIG. 2. The line is shifted parallel, until the desired pressure $p_{prim}=p_{pri,soll}$ is reached.

In operation, the requisite pressure $p_{sec,soll}$ in the secondary pressure chamber is now, as already mentioned, determined via a performance graph—for instance as known from DE 195 19 162 A1 or U.S. Pat. No. 5,971,876. The current $I_{sec}$ is then set to the value $I_{sec,soll}$ required for this purpose, and is left there. Next, via the current $I_{prim}$, the primary pressure valve $V_{prim}$ is actuated, as a result of which the pressure $p_{prim}$ also changes. The pressure $p_{prim}$ is carried via the control line 20 to the secondary pressure valve $V_{sec}$. As a result, the secondary pressure valve $V_{sec}$ adjusts. The pressure $p_{sec}$ thus changes, which in turn affects the pressure $p_{prim}$. As a consequence, the pressure $p_{prim}$ is established indirectly. Thus via the current $I_{prim}$, the pressure $p_{sec}$ in the secondary pressure chamber is regulated, and the pressure $p_{prim}$ in the primary pressure chamber is established indirectly.

What is claimed is:

1. A system (10) formed as an electrohydraulic system (10), for adjusting the contract pressures of a continuously variable gear formed as a double-cone pulley belt-contact gear, which has a device for changing the gear ratio of the gear having at least one primary pressure chamber and one secondary pressure chamber, having an electrically triggerable primary pressure valve ($V_{prim}$) for adjusting the pressure in the primary pressure chamber and an electrically triggerable secondary pressure valve ($V_{sec}$) for adjusting the pressure in the secondary pressure chamber, the pressure ($p_{prim}$) of the primary pressure chamber and the pressure ($p_{sec}$) of the secondary pressure chamber being carried to the secondary pressure valve ($V_{sec}$), characterized in that the control signal ($I_{sec}$) of the secondary valve ($V_{sec}$) is set to a value ($I_{sec,soll}$) which corresponds to a predetermined pressure ($p_{prim,soll}$) in the primary pressure chamber and to a predetermined pressure ($p_{sec,soll}$) in the secondary pressure chamber, and the pressure ($p_{sec}$) in the secondary pressure chamber is regulated via the control signal ($I_{prim}$) of the primary valve ($V_{prim}$), so that the pressure ($p_{prim}$) in the primary pressure chamber is established indirectly.

2. The system (10) of claim 1, characterized in that for controlling the pressure ($p_{prim}$) in the primary pressure chamber, the control signal ($I_{sec}$) of the secondary valve ($V_{sec}$) is defined as a function of the sum of the product of a constant ($k_{prim}$) of the primary pressure valve ($V_{sec}$) and the pressure ($p_{prim,soll}$) of the primary pressure chamber, and the product of a constant ($k_{sec}$) of the secondary pressure valve ($V_{sec}$) and the pressure ($p_{sec,soll}$) of the secondary pressure chamber, which is done by regulating the pressure ($p_{sec}$) in the secondary pressure chamber.

3. The system (10) of claim 1, characterized in that the pressure ($p_{sec}$) in the secondary pressure chamber is regulated with the control signal ($I_{sec}$) of the primary pressure valve ($V_{prim}$).

4. The system (10) of one of claim 1, characterized in that the adjustment of the contract pressures is done when the gear is at a standstill.

5. The system (10) of claim 1, characterized in that the adjustment of the contract pressures is effected when the gear is virtually in a stage selected from the group consisting of at a standstill and at the highest gear ratio.

6. The system (10) of claim 1, characterized in that means are provided with which the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber is adapted during operation.

7. The system (10) of claim 6, characterized in that the ascertainment of the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber is effected in an operating state in which the pressure ($p_{prim}$) in the primary pressure chamber is zero.

8. The system (10) of claim 7, characterized in that for establishing the operating state in which the pressure ($p_{prim}$) in the primary pressure chamber is zero, the primary pressure valve ($V_{sec}$) is opened in the direction of low pressure with the aid of the control signal ($I_{prim}$).

9. The system (10) of claim 6, characterized in that the ascertainment of the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber is effected in an operating state in which the pressure ($p_{prim}$) in the primary pressure chamber is approximately equal to the pressure ($p_{sec}$) in the secondary pressure chamber.

10. The system (10) of claim 6, characterized in that for establishing the operating state in which the pressure ($p_{prim}$) in the primary pressure chamber is approximately equal to the pressure ($p_{sec}$) in the secondary pressure chamber, the primary pressure valve ($V_{sec}$) is opened in the direction of secondary pressure with the aid of the control signal ($I_{prim}$).

11. The system (10) of claim 6, characterized in that the ascertainment of the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber is effected in the form of determining an offset control signal ($I_{sec,offset}$).

12. The system (10) of claim 6, characterized in that the ascertainment of the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber, the measured secondary pressure ($p_{sec}$) is compared with a predetermined pressure ($p_{sec,soll}$) of the secondary pressure chamber, and as a function of the comparison, the relationship between the control signal ($I_{sec}$) of the secondary valve ($V_{sec}$) and the predetermined pressure ($p_{prim,soll}$) in the primary pressure chamber and a predetermined pressure ($p_{sec,soll}$) of the secondary pressure chamber is corrected.

* * * * *